United States Patent
Wrabel et al.

[15] 3,668,476

[45] June 6, 1972

[54] SELF-LOCKING ENCLOSURE FOR ELECTRONIC CIRCUITRY AND METHOD OF ASSEMBLING THE SAME

[72] Inventors: James Adam Wrabel, Chicago; Casimer Joseph Dabrowski, Mount Prospect, both of Ill.

[73] Assignee: The Seeburg Corporation of Delaware, Chicago, Ill.

[22] Filed: Sept. 11, 1970

[21] Appl. No.: 71,583

[52] U.S. Cl. ....................317/101 DH, 29/626

[51] Int. Cl. ....................H02b 1/02

[58] Field of Search ......317/101 R, 101 C, 101 DH, 101 CC; 29/626; 333/84 M; 220/60

[56] References Cited

UNITED STATES PATENTS 3,052,821 9/1962 Scoville ....................317/101 R
3,161,345 12/1964 McLeod ....................220/60
3,460,069 8/1969 Uberbacher et al. ....................333/84 M
3,524,198 8/1970 Malmstadt et al. ....................317/101 DH
3,408,602 10/1968 McWhorter ....................317/101 C
3,532,840 10/1970 Bauer ....................220/60
3,465,090 9/1969 Rose ....................220/60

*Primary Examiner*—David Smith, Jr.
*Attorney*—Ronald L. Engel, Daniel W. Vittum, Jr., Gomer W. Walters and John A. Waters

[57] ABSTRACT

Electronic printed circuit boards are positioned in multiple layers within a hollow plastic body having self-locking sections which are snapped into place entirely enclosing the circuit boards within the enclosure. Locking screws are passed through all of the sections and a seal is placed over the screws to prevent unauthorized opening of the enclosure and tampering with the circuitry contained therein. Openings are provided in the enclosure for electrical connections to extend through the wall of the enclosure to provide input signals to and extract output signals from the circuits contained therein.

13 Claims, 9 Drawing Figures

INVENTORS.
CASIMER J. DABROWSKI
JAMES A. WRABEL

Gomer W. Walters
Atty.

INVENTORS.
CASIMER J. DABROWSKI
JAMES A. WRABEL

Gomer W. Walters
Atty.

INVENTORS.
CASIMER J. DABROWSKI
JAMES A. WRABEL

Gomer W. Walters
Atty

INVENTORS.
CASIMER J. DABROWSKI
JAMES A. WRABEL
Gomer W. Walters
Atty.

INVENTORS.
CASIMER J. DABROWSKI
JAMES A. WRABEL
BY Gomer W. Walters
ATTY

INVENTORS
CASIMER J. DABROWSKI
JAMES A. WRABEL

BY Gomer W. Walters

INVENTORS.
CASIMER J. DABROWSKI
JAMES A. WRABEL

BY

Gomer W. Walters

SELF-LOCKING ENCLOSURE FOR ELECTRONIC CIRCUITRY AND METHOD OF ASSEMBLING THE SAME

BACKGROUND OF THE INVENTION

1. Field of the Invention

This invention relates to an enclosure for electronic circuitry and the like and, more particularly, to a self-locking sealable enclosure that prevents unauthorized tampering with the circuitry contained therein.

2. Description of the Prior Art

Enclosures or chassis heretofore known to the art for supporting electronic circuitry and/or printed circuit boards have comprised frames or chassis formed from metal, wood, plastic or other suitable materials with the electronic circuit components or circuit boards mounted thereto. Typically, electrical circuits are mounted so that the replaceable tubes and electrical components extend from one side of the chassis and the solder connections and other electrical components such as capacitors and resistors are on the opposite side of the chassis. Ordinarily, the chassis is constructed in such a manner as to allow easy access to either side of the chassis for repair and maintenance purposes. However, the chassis may have to be physically removed from a cabinet or other enclosure to permit access.

With the development of reliable solid state electronic devices and self-contained integrated electronic circuits, the necessity for providing easy access to the electrical components of an electronic circuit have been substantially reduced. Solid state devices do not deteriorate with age at the same rate as vacuum tubes, and thus it is not as necessary to provide access for periodic replacement. Moreover, solid state devices are not always interchangeable, and thus, in particularly critical electronic equipment, replacement of one solid state device cannot be made without replacing other electrical components which affect the parameters of the solid state device. Consequently, modular self-contained circuit units mounted on printed circuit boards have been developed as an aid to repair of electronic equipment. Therefore, if one component on the circuit board is defective or otherwise breaks down, the entire circuit board is replaced.

However, as a result of inexperience and lack of knowledge by many electronic technicians, repairs to individual components on self-contained circuit board units are often attempted with the ultimate result of damage to other components on the self-contained circuit board units or other components on other circuit boards.

BRIEF SUMMARY OF THE INVENTION

To prevent untrained and unskilled technicians from attempting unnecessary or harmful repairs to the self-contained circuit board units, an enclosure in accordance with the present invention that does not permit access to the components was developed. However, since electronic equipment is often extremely costly and must remain in operation to prevent expenses due to down time, it is not desirable to provide a sealed enclosure for an entire piece of electronic equipment. Instead, smaller self-contained interchangeable modular units within a larger electronic apparatus in accordance with the present invention were developed to provide more advantageous results.

In accordance with the present invention a self-locking enclosure for electronic circuitry and the like comprises a hollow body member having open ends at each end thereof. Mating closure members having self-locking means affixed thereto engage with engaging means provided around the periphery of the body member, thus locking the closure members in place over the open ends of the body member. Printed circuit boards having electrical circuits thereon are positioned within the hollow body member before the closure members are locked in place so that openings are provided in the walls of the hollow body member to allow portions of the circuit boards to extend through openings so that electrical continuity to the electrical circuits may be achieved. In addition, to the locking means, screws may be utilized to secure the closure members, and a tamperproof seal may be placed around the enclosure to prevent removal of the screws or opening of the enclosure without breaking the seal. The seal allows the manufacturer to be able to determine when there has been unauthorized tampering with the electrical components in violation of a warranty or other guarantee.

Moreover, since each individual enclosure contains one or more circuit boards, each enclosure can be designed to enclose a specific portion of the circuitry of a larger electronic apparatus. In this way, each enclosure of the present invention may act as a modular unit of specific portions of the circuitry of the entire apparatus. Thus, maintenance and repair of the apparatus is facilitated since the technician can easily trouble shoot the apparatus to determine the probable portion of the circuitry wherein the problem lies and replace that portion of the circuitry by a new modular unit.

Thereafter, the enclosure and circuitry contained therein can be returned to a qualified repair shop having the technical capabilities of repairing the circuitry and opened for repair under the control of the manufacturer. However, while such repairs are being made, the electronic apparatus is still in operation and the economic effects of prolonged down time for repair will have been mitigated.

Further, the self-locking means of the closure members are fabricated to snap into place upon positioning of the closure members over the open ends of the body member. However, the locking means are fabricated so that they may be disengaged from the body member by utilization of simple tools after the seal and screws are removed. Thus, while the closure members may be easily snapped into place during the manufacture and assembly of the enclosed modular unit, the enclosure of the present invention is designed to permit easy access to the components contained therein when repairs are required.

By providing an extension of the electrical circuit board through the side wall of the enclosure, the interchangeability of the modular unit is facilitated since appropriate electrical contacts or jacks may be provided to mate with the protrusions of the circuit board and thereby provide direct electrical continuity to the circuits contained within the enclosure. Thus, the extensions of the circuit board act as a male jack for insertion into a comating female plug connected to other portions of the apparatus.

Thus, it is an object of the present invention to provide a self-locking enclosure for electronic circuitry and the like which permits rapid assembly of the components into a sealable modular unit.

A further object of the present invention is to provide a self-locking enclosure for electronic circuitry and the like which prevents unauthorized tampering with the electronic circuitry contained therein.

Still a further object of the present invention is to provide a self-locking enclosure for electronic circuitry and the like which may be easily removed from the electronic apparatus and interchanged with a new unit.

It is still a further object of the present invention to provide a self-locking enclosure for electronic circuitry and the like which can be sealed in such a manner as to prevent unauthorized tampering with the components contained therein and thereby enabling the manufacturer to be able to determine if there has been unauthorized tampering.

A further object of the present invention is to provide a self-locking enclosure for electronic circuitry and the like which may be easily opened with the use of simple tools by authorized personnel to permit repair or replacement of components contained therein.

These and other objects, advantages and features of the subject invention will hereinafter appear, and, for the purposes of illustration, but not of limitation, exemplary embodiments of the present invention are illustrated in the accompanying drawings.

DETAILED DESCRIPTION OF PREFERRED EMBODIMENT

Figure 1:
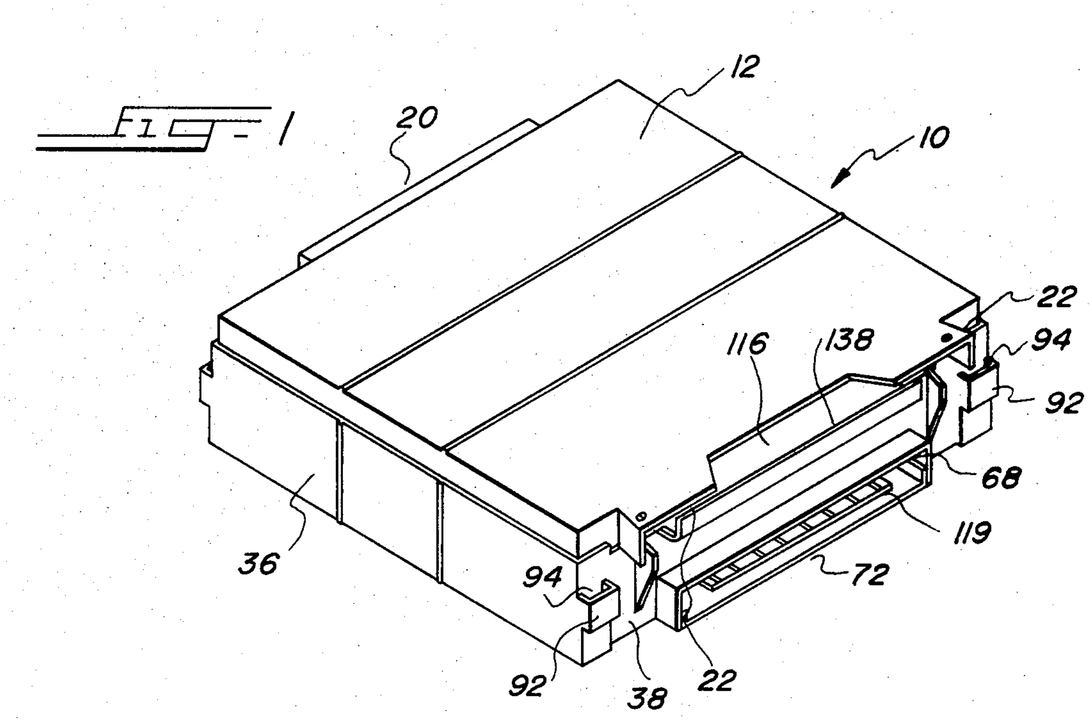
FIG. 1 is an upper left front perspective view of a preferred embodiment of the present invention.

With reference to FIGS. 1, 2, 3 and 4, a molded plastic enclosure 10 comprises top member 12, hollow body member 14 and bottom member 16. Top member 12 is an essentially flat rectangular shaped member having a flange 18 formed around the edge of top member 12, and extending downwardly approximately perpendicular thereto. Molded on the exterior of flange 18 at the rear of top member 12 is circuit board contact guard 20. Molded at the front end of top member 12 is circuit board contact guard 22 having a gap 24 formed therein. Integrally molded to the edge of flange 18 are locking members 26 and 27 having triangular shaped protrusions 28 and 29 respectively extending outwardly therefrom. On the interior of top member 12 and adjacent flange 18 are reinforced areas 30. Formed within reinforced areas 30 are threaded openings 32 for receiving screws. Also formed in flange 18 adjacent reinforced areas 30 are indentations 34. Integrally formed adjacent circuit board contact guard 22 and extending inwardly therefrom is reinforcing flange 19. Within reinforcing flange 19 and extending onto guard 22 is circuit board guide flange 21.

Hollow body member 14 comprises side walls 36, front wall 38, and back wall 40. Formed around the interior portion of the walls of hollow body member 14 is flange 42. An enlarged portion 44 of flange 42 is formed approximately the middle of the side walls 36. Molded integrally with enlarged portion 44 is a cylindrical screw guide 46 having a circular opening 48 through the center thereof. Also positioned on enlarged portions 44 are tabs 49 which mate with indentations 34 of top member 12. Formed in back wall 40 are grooves 50, and at the bottom of grooves 50 are openings 52. Grooves 50 are dimensioned to slidably accept locking members 26 when top member 12 is placed over hollow body member 14. Openings 52 are dimensioned to permit protrusions 28 to spring into openings 52 when top member 12 is placed onto body member 14 thereby locking top member 12 onto hollow body member 14.

Formed adjacent and perpendicular to front wall 38 is extended flange member 54 having openings 56 therein. Openings 56 are dimensioned to accept the locking members 27 and engage protrusions 29 when top member 12 is placed over hollow body member 14.

Formed in back wall 40 is upper open area 58. Also formed in back wall 40 is lower open area 60. Positioned about upper and lower open areas 58 and 60 is circuit board contact guard 62.

Formed in front wall 38 of body member 14 is upper open area 64 and lower open area 66. Formed about open area 66 is circuit board contact guard 68, and formed about open area 64 and extending along extended flange 54 is circuit board guide flange 59.

Figure 4:
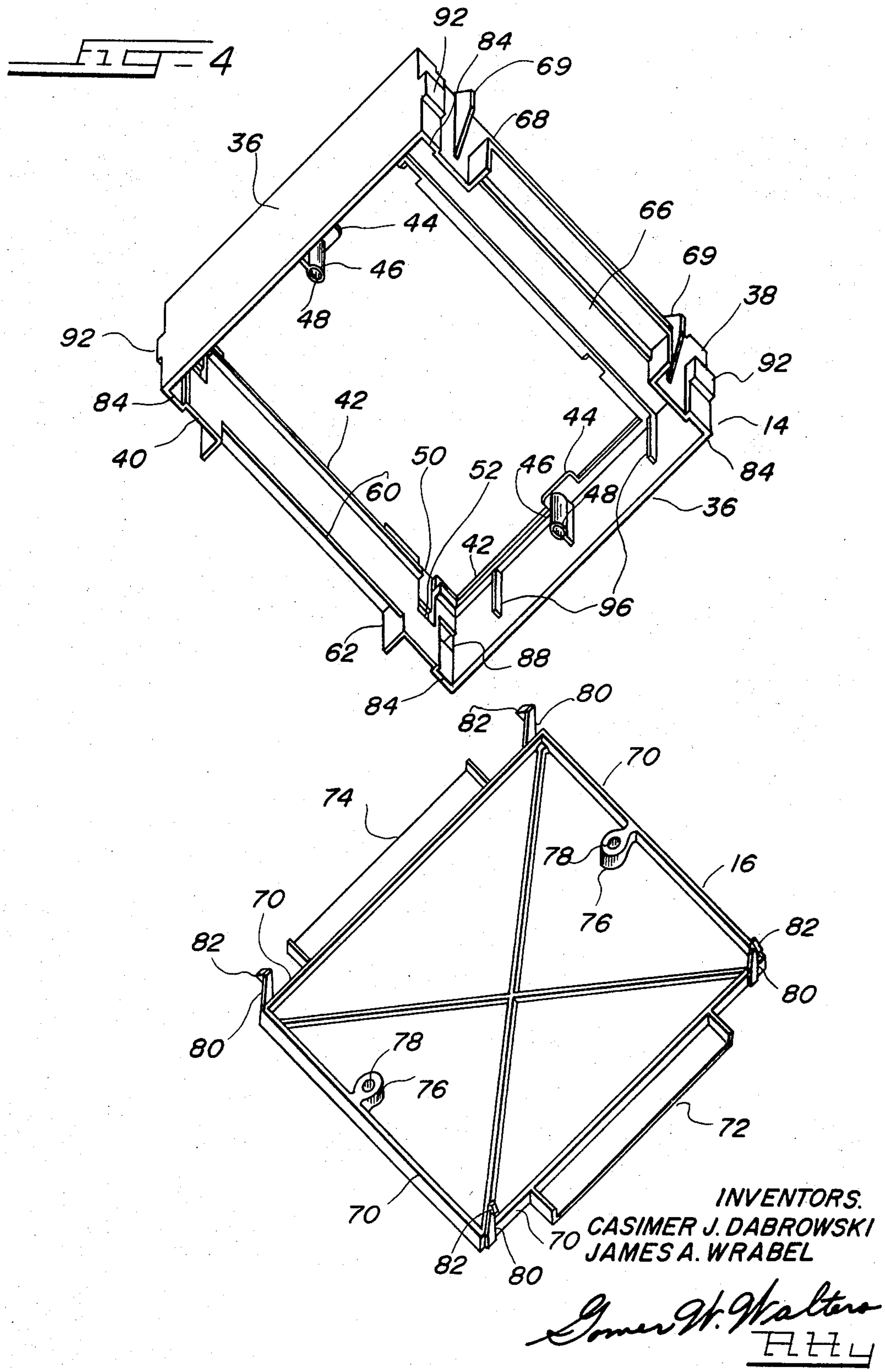
FIG. 4 is an exploded perspective view with the bottom of the enclosure removed to show the internal configuration of the enclosure.

With reference to FIG. 4, bottom member 16 has a flange 70 formed about the exterior edge. Formed at the front edge of flange 70 is circuit board contact guard 72. At the rear of bottom member 16 formed to flange 70 is circuit board contact guard 74. On the interior portion of bottom member 16 are formed reinforced areas 76 having circular openings 78 for accepting screws. Integrally molded to flange 70 are locking members 80 having triangular shaped protrusions 82 extending outwardly from the end thereof. Formed in the front wall 38 and back wall 40 of body member 14 are grooves 84 dimensioned to slidably accept locking members 80. Provided at the upper portion of grooves 84 are openings 88 dimensioned to accept protrusions 82. When bottom member 16 is joined with body member 14, protrusions 82 are deflected by the interior edge of grooves 84 until protrusion 82 can snap into openings 88. Since locking members 80 are integrally molded from resilient plastic material, they tend to spring protrusions 82 into openings 88 thereby locking bottom member 16 onto body member 14.

Figure 2:
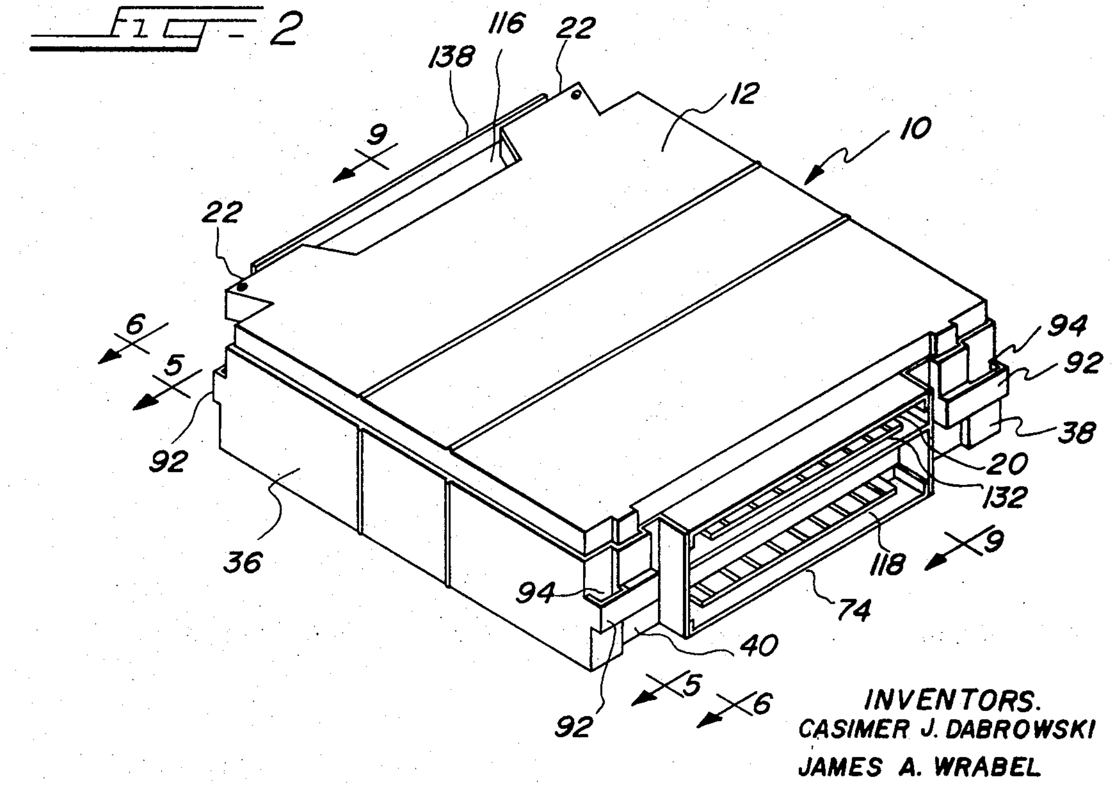
FIG. 2 is an upper right rear perspective view of a preferred embodiment of the present invention.
Figure 3:
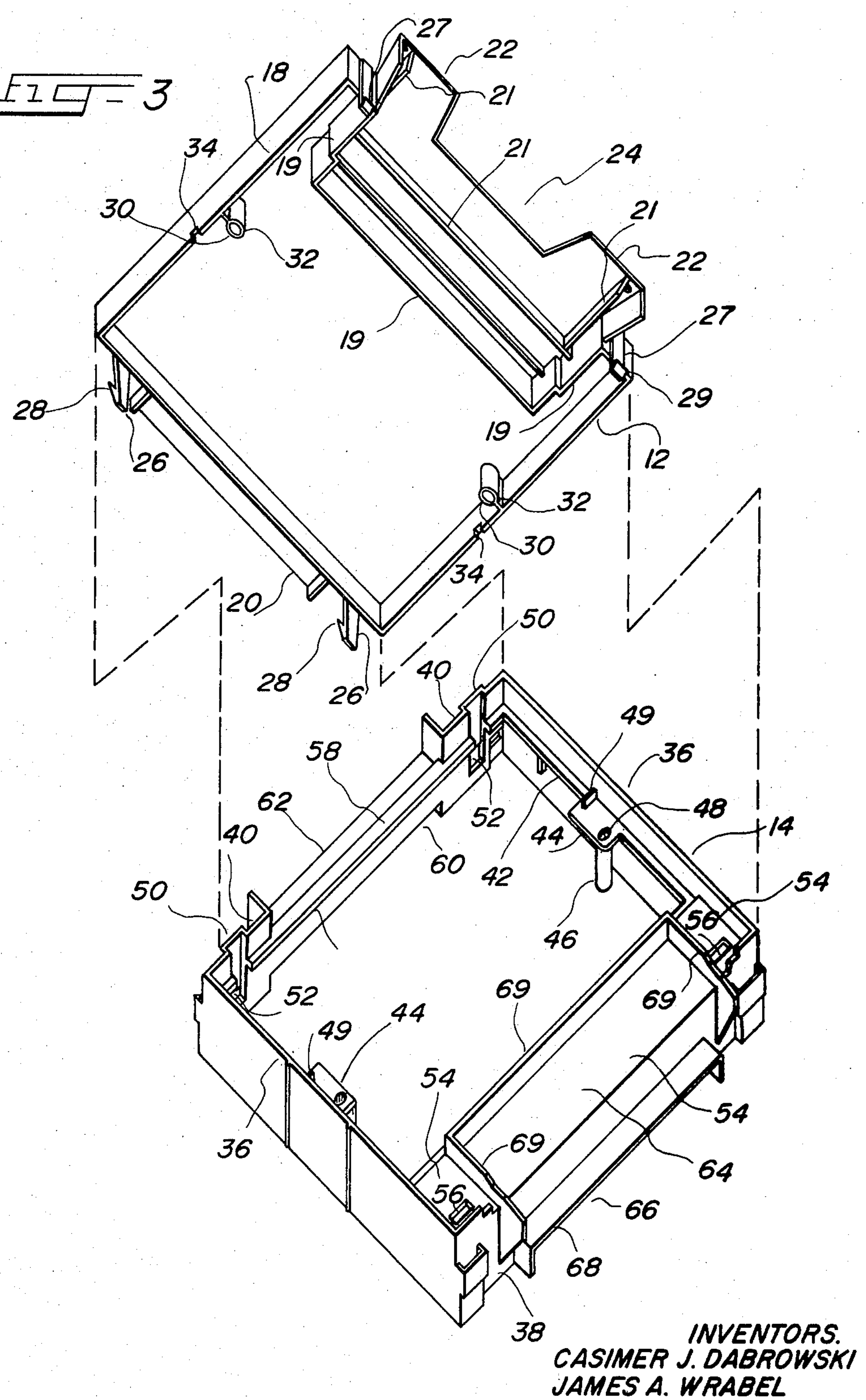
FIG. 3 is an exploded perspective view with the top of the enclosure removed to show the internal configuration of the enclosure.
Figure 5:
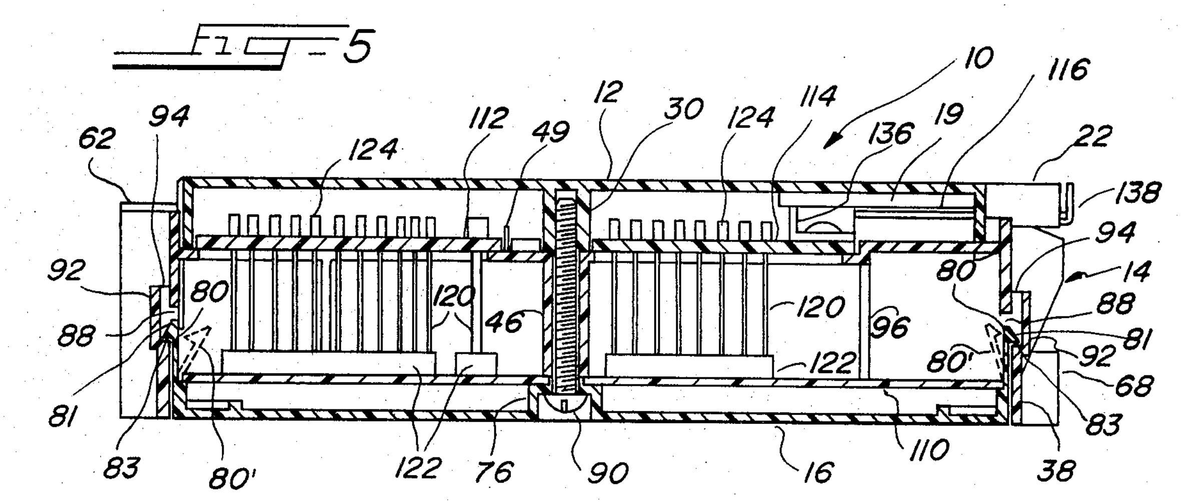
FIG. 5 is a cross-sectional view of the preferred embodiment taken substantially along the line 5—5 of FIG. 2.

FIG. 5 illustrates a cross-sectional view of the enclosure 10 of the present invention taken substantially along line 5—5 of FIG. 2. FIG. 5 illustrates enclosure 10 in assembled form showing the protrusions 82 of locking members 80 extending into opening 88 in front wall 38 and rear wall 40 of body member 14. The dotted lines denoted by 80′ illustrate the position of locking means 80 when deflected as bottom member 16 is snapped into position. As FIG. 5 illustrates, protrusions 82 have a tapered surface 81 to cause protrusions 82 to deflect when inserted into grooves 84. Once in position, protrusions 82 extend into openings 88 and gripping surface 83 of protrusion 82 contacts the bottom of opening 88 thereby retaining bottom member 16 in position. Screws 90 may be inserted through openings 78 in reinforced areas 76; through opening 48 in screw guide 46; and threaded into threaded opening 32 in reinforced area 30 in top member 12 to securely hold top member 12 and bottom member 16 against body member 14.

As FIGS. 2 and 5 illustrate, provided over openings 88 in body member 14 are wall extensions 92. At the upper portion of wall extensions 92 are formed rectangular openings 94. Rectangular openings 94 permit the insertion of a screwdriver tip or other appropriate instrument to deflect locking members 80, thereby disengaging protrusions 82 from openings 88 to allow the removal of bottom member 16 from body member 14 after screws 90 have been removed.

Figure 6:
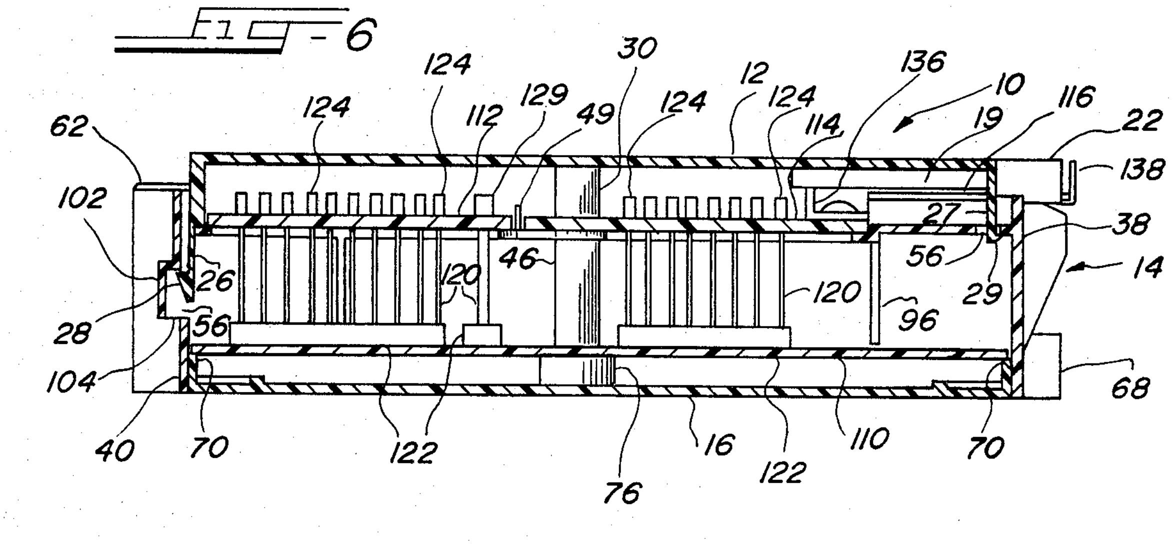
FIG. 6 is a cross-sectional view of the embodiment taken substantially along the line 6—6 of FIG. 2.

Similarly, as FIG. 6 illustrates, provided over openings 52 in back wall 40 of body member 14 are wall extensions 102. Provided between back wall 40 and wall extensions 102 are rectangular openings 104. As discussed above, by inserting the point of a screwdriver or other appropriate instrument into rectangular openings 104, locking members 26 can be moved until protrusions 28 are disengaged from openings 52 thus permitting top member 12 to be removed from body member 14.

FIGS. 5 and 6 illustrate the positioning of the circuit boards 110, 112; 114 and 116 within the hollow cavity of the enclosure 10. Electrical continuity between circuit boards 110, 112 and 114 may be provided by circuit board connectors 120. Circuit board connectors 120 are attached to bases 122 which are affixed to circuit board 110. Circuit board connectors 120 take the form of elongated metal blades which are inserted through openings (not shown) in circuit boards 112 and 114. The ends of circuit board connectors 120 are inserted into receptacles 124 which provide electrical continuity.

Figure 7:
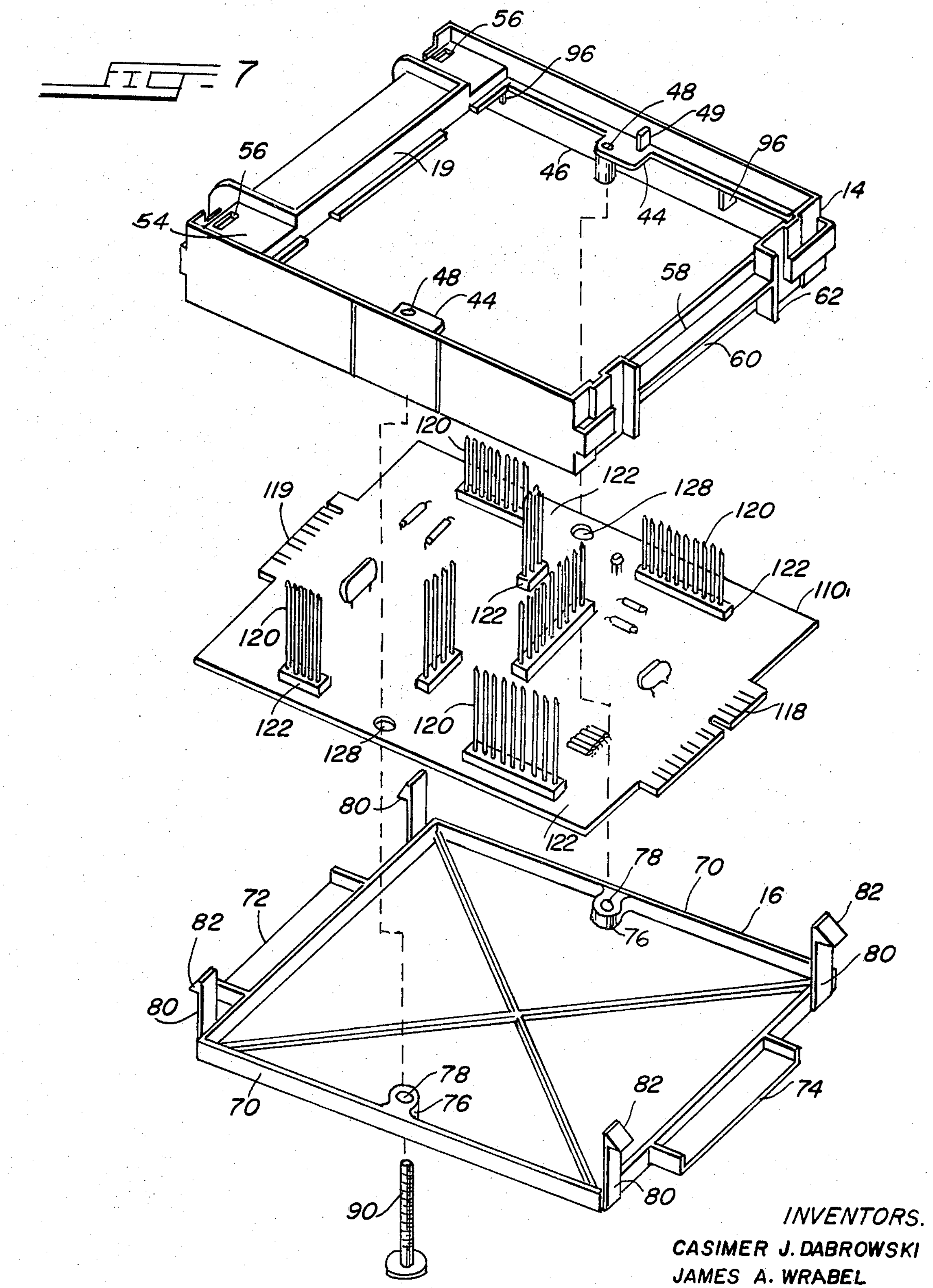
FIG. 7 is an exploded perspective view of the present invention showing the assembly of several portions of the preferred embodiment of the present invention.
Figure 8:
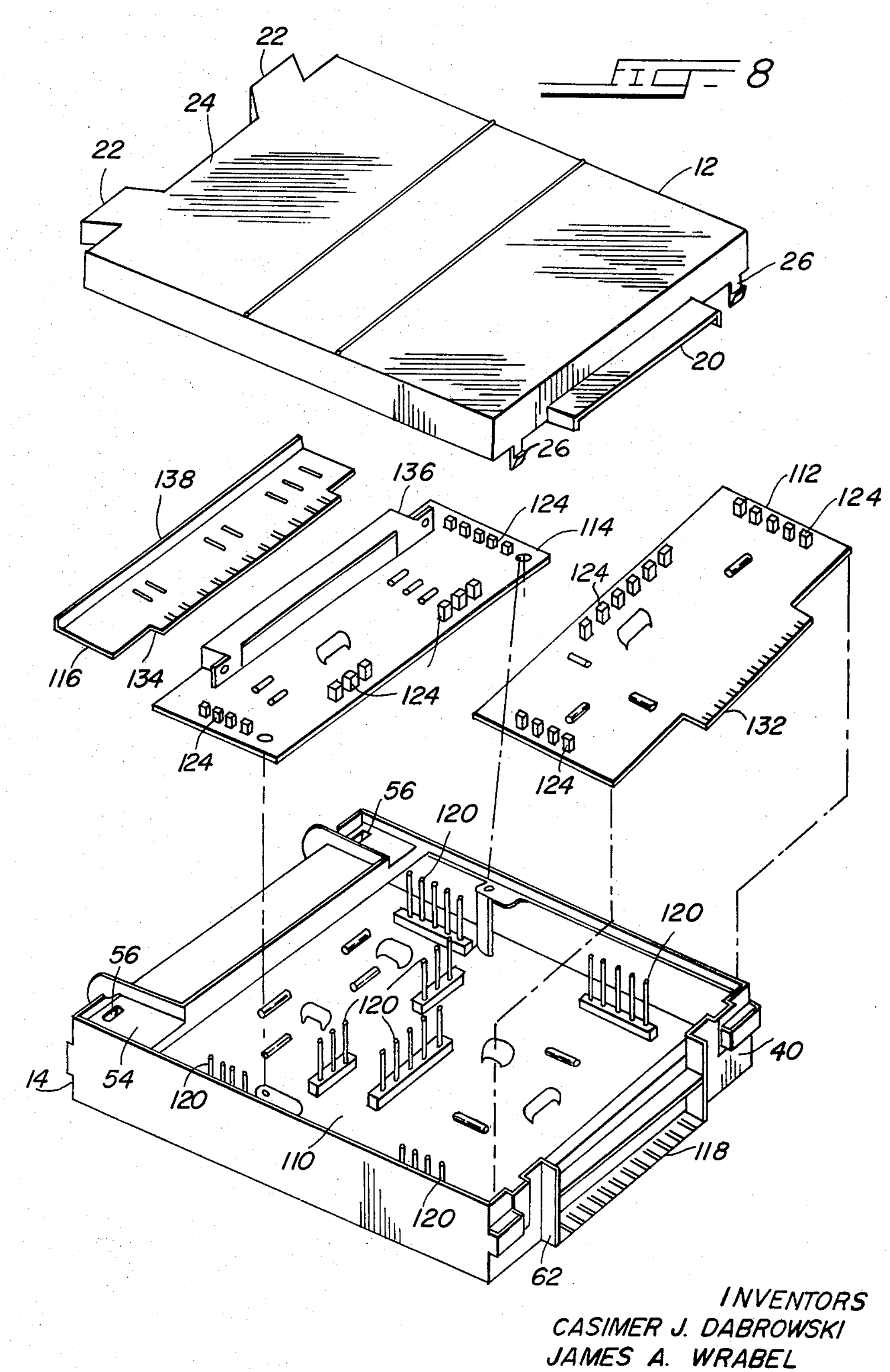
FIG. 8 is an exploded view showing further assembly of the preferred embodiment of the present invention.
Figure 9:
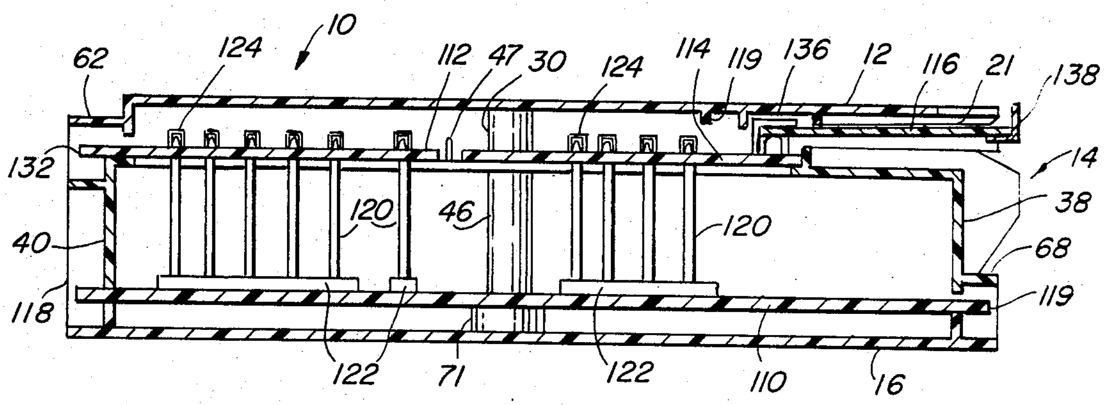
FIG. 9 is a cross-sectional view of the present invention taken substantially along line 9—9 of FIG. 2.

FIGS. 7 and 8 illustrate the assembly of the enclosure 10 of the present invention. Circuit board 110 is placed on bottom member 16 so that holes 128 in circuit board 110 are aligned with circular openings 78 in reinforced area 76. As FIGS. 5 and 6 illustrate, circuit board 110 is positioned so that it rests against the upper surface of flange 70 and reinforced area 76 of bottom member 16. Body member 14 is then placed over circuit board 110 and bottom member 16. Body member 14 is dimensioned to comatingly fit about the exterior of flange 70 of bottom member 16. (see FIGS. 5 and 6) As body member 14 is moved down over bottom member 16, locking members 80 are deflected (see dotted lines in FIG. 5) as protrusions 82 are deflected by the interior surfaces of grooves 84. When bottom member 16 is positioned so that it is essentially flush with the bottom edge of the walls of body member 14 (see FIGS. 5 and 6) protrusions 82 on locking members 80 snap into openings 88 thus locking bottom member 16 to body member 14. Circuit board 110 is held in place by the lower surface of tubular screw guide 46 and is thus rigidly held in place. Also formed on the interior surface of side wall 36 of body member 14 are flanges 96 which also tend to hold circuit board 110 against flange 96 which also tend to hold circuit board 110 against flange 70. Extensions 118 and 119 of circuit board 110 extend through open areas 60 and 66 respectively in body member 14 when body member 14 is snapped onto bottom member 16.

FIG. 8 illustrates the assembly of circuit boards 112, 114 and 116 and top member 12. Circuit board 114 is positioned against flange 42 of body member 14 so that holes 130 are aligned with openings 48 in enlarged portions 44 of flange 42. In positioning circuit board 114, the circuit board connectors 120 of circuit board 110 are inserted into mating receptacles 124 on circuit board 114. Thus, electrical continuity between circuit boards 114 and 110 may be achieved.

Circuit board 112 is positioned within body member 14 against flange 42 and between tabs 49 and back wall 40. In this position, extension 132 of circuit board 112 extends through upper open area 58 of back wall 40. Similarly, circuit board connectors 120 on circuit board 110 are inserted into receptacles 124 on circuit board 112 thereby providing electrical continuity between circuit board 110 and circuit board 112. Extension 134 of circuit board 116 is then inserted into elongated jack 136 attached to circuit board 114 thus, providing electrical continuity between circuit board 114 and circuit board 116.

With circuit boards 112, 114 and 116 in position, top member 12 may be positioned over the top opening of body member 14. When in proper position, locking members 26 and 27 snap into openings 56 and 52 in the same manner as locking members 80 on bottom member 16 snap into openings 88. Screws 90 can then be inserted and tightened to firmly hold top member 12 and bottom member 16 against body member 14 thus relieving any strain on locking members 26 and 80.

When fully assembled, extensions 118 and 119 of circuit board 110 and extension 132 of circuit board 112 extend through open areas 60, 66 and 58 of body member 14 respectively. Consequently, an electric connector jack can be inserted over extensions 118, 119 of circuit board 110 and extension 132 of circuit board 112 to provide electrical continuity from external electrical components to the circuit boards contained in the enclosure 10.

In addition, circuit board 116 can be removed without opening the enclosure and disturbing circuit boards 110, 112 and 114 by grasping metal flange 138 attached to circuit board 116 and pulling extension 134 from elongated jack 136. As pointed out above, provided in circuit board contact guard 22 is gap 24 to permit easy grasping of metal flange 138 for removing circuit board 116. Thus, the electronic circuitry contained in the enclosure 10 may be so designed to permit programming and/or other standard changes to be made by varying the electrical circuitry on circuit board 116. Thus, at a future date, if it is desired to change the internal circuitry of the enclosure 10, a new circuit board 116 may be inserted, thus obviating the necessity for opening enclosure 10 and changing the internal circuitry contained therein.

Circuit board contact guards 20, 62, 60, 68, 72 and 74 protect extensions 118, 119 and 132 from damaging contact and also serve to guide the comating electrical connector jacks over the extensions 118, 119 and 132. Similarly, circuit board contact guard 22 protects circuit board 116 from harmful contact. Circuit board guide flanges 21 and 69 also act to guide circuit board 116 into elongated jack 136 when circuit board 116 is inserted.

Once fully assembled, enclosure 10 may be sealed so that it cannot be opened without visually indicating that the seal has been broken. Thus, when assembled and sealed, enclosure 10 houses a self-contained circuit unit in modular form which may be interchangeably utilized in various electronic applications. By inserting comating electrical connector jacks over extensions 118, 119 and 132, electrical continuity from the other components of an electrical apparatus may be provided. If, at a future date, the circuits contained in enclosure 10 are in need of repair, a new modular unit may be interchanged and the unit returned to the repair shop for opening and repair by qualified, trained technicians. Thus, in this manner, it is unnecessary to return the entire electronic apparatus if repairs are needed. Once repaired, the enclosure 10 can be resealed to prevent future unauthorized opening.

Thus, the enclosure 10 of the present invention provides decided advantages over the enclosures for electronic circuitry and the like heretofore known to the art. Utilizing the enclosure 10 of the present invention, not only is unauthorized tampering of the delicate electronic circuitry eliminated but also the circuitry can be designed to provide a self-contained modular circuit unit within each enclosure 10. In this manner, trouble shooting and repair costs are reduced and costly down time practically eliminated.

The embodiment described above is designed so that there are two open ends and two closure members. However, by slight modification an enclosure in accordance with the present invention may be designed having only one open end and one closure member. The circuit boards may be placed within the enclosure as long as at least one open end is provided.

It should also be understood that various changes, modifications, and variations in the structure and function of the present invention may be affected without departing from the spirit and scope of the present invention as defined in the appended claims.

We claim:

1. A self-locking enclosure for electronic circuitry comprising:

a unitary body member having first and second open ends, and a plurality of side walls defining therein a hollow cavity;

engaging means positioned on said side walls of said body member adjacent said first and said second open ends, said engaging means comprising:

grooves formed in the side walls within hollow cavity, said grooves extending inwardly from said first and second open ends;

engaging openings through said side walls at the inward end of said grooves;

protecting means positioned over said engaging openings on the outside of said body member so that direct access to said engaging openings cannot be made from the outside of said body member;

electronic circuit support means having the electronic circuitry positioned thereon, said electronic circuit support means positioned within said hollow cavity of said body member;

a first closure member;

first locking means on said first closure member for interacting with said engaging means to lock said first closure member over said first open end of said body member when said first closure member is positioned over said first open end;

a second closure member;

second locking means on said second closure member for interacting with said engaging means to lock said second closure member over said second open end of said body member when said second closure member is positioned over said second open end;

connecting means extending through the enclosure to convey signals to and from the electronic circuitry; and breakable sealing means to prevent opening of the enclosure without breaking the sealing means.

2. A self-locking enclosure as claimed in claim 1 wherein said body member and said first and second closure members are formed of a resilient plastic material.

3. A self-locking enclosure as claimed in claim 1 wherein:

said body member has four side walls joined in an essentially rectangular parallelepiped configuration; and said first and second closure members are essentially flat comating rectangular members.

4. A self-locking enclosure as claimed in claim 3 wherein said first and second locking means comprise integrally molded resilient extensions extending essentially perpendicularly from said first and second closure members, respectively, each of said extensions dimensioned to slidably mate with said grooves and having a protrusion at the free end thereof, each of said protrusions having an engaging surface essentially perpendicular to the extension on which it is located and a cam surface at an angle to the extension on which it is located, said engaging surface for engaging with said engaging openings, thereby locking said first and second closure members over said first and second open ends of said body member.

5. A self-locking enclosure as claimed in claim 3 wherein said electronic circuit support means comprises at least two printed circuit boards positioned essentially parallel to one another and essentially perpendicular to said side walls of said body member.

6. A self-locking enclosure as claimed in claim 5 wherein said connecting means comprises one or more extensions of said printed circuit boards having electrical contacts thereon extending through one or more openings between said side walls and said closure members.

7. A self-locking enclosure as claimed in claim 4 wherein access means are provided through said protecting means to said engaging openings in said side walls to permit an appropriate tool to be inserted in a direction essentially parallel to said side walls so that the tool contacts said cam surface on said protrusion so that the corresponding extension is pivoted inwardly and the corresponding engaging surface disengages the associated engaging opening thereby permitting said closure members to be detached from said body member.

8. A self-locking enclosure as claimed in claim 1, wherein said sealing means comprises at least one screw to connect said first and second closure members to said body member to retain said first and second closure members in a closed relationship with said body member, and a warranty seal placed over said screws to prevent opening the enclosure without breaking the seal and thereby indicating unauthorized opening of the enclosure.

9. A self-locking enclosure as claimed in claim 1 wherein flange means are integrally molded to the interior of said side walls of said body member for positioning electronic circuit support means within said hollow cavity of said body member.

10. A self-locking enclosure for electronic circuitry comprising:

a unitary body member having an open end and a plurality of walls defining therein a hollow cavity;

engaging means positioned on said walls adjacent said open end, said engaging means comprising:

grooves formed in the side walls within said hollow cavity, said grooves extending inwardly from said open end;

engaging openings through said side walls at the inward end of said grooves;

protecting means positioned over said engaging openings on the outside of said body member so that direct access to said engaging openings cannot be made from the outside of said body member;

electronic circuit support means having the electronic circuitry positioned thereon, said electronic circuit support means positioned within said hollow cavity of said body member;

a closure member;

locking means on said closure member for interacting with said engaging means to lock said closure member over said open end of said body member when said closure member is positioned over said open end;

connecting means extending through the enclosure to convey electrical signals to and from the electronic circuitry; and breakable sealing means to prevent opening of the enclosure without breaking the sealing means.

11. A self-locking enclosure for electronic circuitry comprising:

a base member;

a first electronic circuit support means having a portion of the electronic circuitry positioned thereon, said first support means positioned against and essentially parallel to the interior surface of said base member;

a unitary body member having first and second open ends and four side walls joined in an essentially rectangular parallelepiped configuration defining therein a hollow cavity, said first open end dimensioned to comate with said base member;

engaging means positioned on said side walls adjacent said first and second open ends, said engaging means comprising;

grooves formed in the side walls within said hollow cavity, said grooves extending inwardly from said first and second open ends;

engaging openings through said side walls at the inward end of said grooves;

protecting means positioned over said engaging openings on the outside of said body member so that direct access to said engaging openings cannot be made from the outside of said body member;

interconnecting means positioned on said first electronic circuit support means for interconnecting the electronic circuitry;

first locking means on said base member for interacting with said engaging means to lock said first open end of said body member over said base member when said body member is positioned over said base member thereby retaining said first circuit support means within said hollow cavity of said body member;

a second electronic circuit support means having a portion of the electronic circuitry thereon;

receptive means positioned on said second circuit support means for receiving and interacting with the interconnecting means to provide electrical continuity between the portions of the electronic circuit on said first and second circuit support means, said second circuit support means positioned within the second open end so that said receptive means interact with said interconnecting means;

a top member, said top member dimensioned to comate with said second open end;

second locking means on said top member for interacting with said engaging means to lock said top member over said second open end of said body member when said top member is positioned over said second open end thereby retaining said second circuit support means within said hollow cavity of said body member;

connecting means extending through the enclosure to convey signals to and from the electronic circuitry;

access means through said protecting means to said engaging openings in said side walls to permit an appropriate tool to be inserted to disengage said locking means from said engaging means.

12. A self-locking enclosure, as claimed in claim 11 wherein said interconnecting means comprise elongated metal members extending upwardly from and essentially perpendicular to the first circuit support means, and the receptive means comprise electrical jacks for receiving and comating with the elongated metal members.

13. In an electronic circuit modular unit comprising first and second detachably interconnecting circuit boards, a unitary hollow body member having first and second open ends, engaging means positioned on the body member adjacent the first and second open ends, first and second closure means, locking means on the first and second closure means for engaging with the engaging means and locking the closure means over the first and second open ends, and positioning means within the enclosure body to position and retain the circuit boards in a fixed position, a method of assembly comprising the steps of:

placing the first circuit board into the first open end against the positioning means;

positioning the first closure means over the first open end;

causing relative motion to occur between the body member and the first closure means until the locking means engage with the engaging means thereby locking the first closure means over the first open end thereby retaining the first circuit board against the positioning means;

placing the second circuit board into the second open end against the positioning means;

detachably interconnecting the first and second circuit boards thereby forming two layers of circuit boards within the enclosure;

positioning the second closure means over the second open end; and causing relative motion to occur between the body member and the second closure means until the locking means engage with the engaging means thereby locking the second closure means over the first open end thereby retaining the second circuit board against the positioning means.

* * * * *